(12) United States Patent
Woll

(10) Patent No.: US 10,120,262 B2
(45) Date of Patent: Nov. 6, 2018

(54) POWER-SCALABLE NONLINEAR OPTICAL WAVELENGTH CONVERTER

(71) Applicant: KLA-TENCOR CORPORATION, Milpitas, CA (US)

(72) Inventor: Dirk Woll, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/809,016

(22) Filed: Nov. 10, 2017

(65) Prior Publication Data

US 2018/0067377 A1 Mar. 8, 2018

Related U.S. Application Data

(62) Division of application No. 15/197,715, filed on Jun. 29, 2016, now Pat. No. 9,841,655.

(60) Provisional application No. 62/187,739, filed on Jul. 1, 2015.

(51) Int. Cl.
G02F 1/35 (2006.01)
G02B 27/09 (2006.01)
G02F 1/355 (2006.01)
H01S 3/00 (2006.01)

(52) U.S. Cl.
CPC ............ G02F 1/353 (2013.01); G02B 27/09 (2013.01); G02F 1/3501 (2013.01); G02F 1/3551 (2013.01); G02F 2001/3503 (2013.01); G02F 2001/3505 (2013.01); H01S 3/005 (2013.01); H01S 3/0092 (2013.01)

(58) Field of Classification Search
CPC ............ G02F 1/353; G02F 2001/3503; G02F 2001/3505; H01S 3/0092; G02B 27/09
See application file for complete search history.

(56) References Cited

U.S. PATENT DOCUMENTS

| 5,198,837 | A | * | 3/1993 | Ikshizaka | G02B 26/0816 347/256 |
| 5,355,246 | A | * | 10/1994 | Tanuma | G02F 1/37 359/326 |
| 5,592,326 | A | * | 1/1997 | Taira | G02F 1/37 359/326 |
| 5,963,359 | A | * | 10/1999 | Shinozaki | G02B 3/06 359/326 |
| 6,373,868 | B1 | * | 4/2002 | Zhang | H01S 3/0941 372/19 |
| 7,447,244 | B2 | * | 11/2008 | Ma | G02F 1/3501 372/108 |
| 7,792,163 | B2 | * | 9/2010 | Nakayama | G02F 1/37 359/328 |
| 9,841,655 | B2 | * | 12/2017 | Woll | G02F 1/353 |

(Continued)

FOREIGN PATENT DOCUMENTS

JP 05323394 A * 12/1993

*Primary Examiner* — Daniel Petkovsek
(74) *Attorney, Agent, or Firm* — Hodgson Russ LLP

(57) ABSTRACT

A system includes a nonlinear crystal positioned such that a focus of a laser beam is outside the nonlinear crystal in at least one plane perpendicular to a beam propagation direction of the laser beam. The nonlinear crystal is disposed in a crystal mount assembly. A laser beam may be directed at the nonlinear crystal for wavelength conversion. The system may be used as a deep-UV wavelength converter.

14 Claims, 6 Drawing Sheets

(56) References Cited

U.S. PATENT DOCUMENTS

| | | | |
|---|---|---|---|
| 2003/0206288 A1* | 11/2003 | Tabirian | G01J 1/4257 356/121 |
| 2008/0219302 A1* | 9/2008 | Nakayama | G02F 1/37 372/21 |
| 2015/0022805 A1* | 1/2015 | Dribinski | G02F 1/37 356/237.3 |

* cited by examiner

POWER-SCALABLE NONLINEAR OPTICAL WAVELENGTH CONVERTER

CROSS-REFERENCE TO RELATED APPLICATIONS

This application is a divisional of U.S. Pat. No. 9,841,655, filed Jun. 29, 2016, which claims priority to the provisional patent application filed Jul. 1, 2015 and assigned U.S. App. No. 62/187,739, the disclosures of which are hereby incorporated by reference.

FIELD OF THE DISCLOSURE

This disclosure relates to optical wavelength conversion.

BACKGROUND OF THE DISCLOSURE

Inspection processes are used at various steps during semiconductor manufacturing to detect defects on wafers to increase yield. However, as the dimensions of semiconductor devices decrease, inspection becomes more important to the successful manufacture of semiconductor devices because smaller defects can cause the devices to fail. Semiconductor manufacturers seek improved sensitivity to particles, anomalies, and other defect types, while maintaining overall inspection speed (in wafers per hour) in wafer inspection systems.

Each successive node of semiconductor manufacturing requires detection of smaller defects and particles on the wafer. Therefore, higher power and shorter wavelength UV (ultraviolet) lasers for wafer inspection are needed. Because the defect or particle size is reduced, the fraction of the light reflected or scattered by that defect or particle is also typically reduced. As a result, an improved signal-to-noise ratio may be needed to detect smaller defects and particles. If a brighter light source is used to illuminate the defect or particle, then more photons will be scattered or reflected and the signal-to-noise ratio can be improved if other noise sources are controlled. Using shorter wavelengths can further improve the sensitivity to smaller defects because the fraction of light scattered by a particle smaller than the wavelength of light increases as the wavelength decreases.

Some inspection tools for wafers and reticle inspection used in the semiconductor industry rely on deep-ultraviolet (DUV) radiation. Some of the most compact, efficient, and cost effective sources of laser radiation in the UV and DUV spectral regions are based on wavelength conversion of solid-state laser radiation in nonlinear optical crystals. When exposed to high-power DUV-radiation, optical components, including nonlinear optical crystals, are prone to optically induced damage, which limits the maximum power density present on or in each individual component. This power density limitation forces the optics designer to make trade-offs between achievable DUV-power, spatial beam quality, component lifetime, and form factor of the wavelength converter device. Optimizing the beam size in the nonlinear crystal may be needed to take advantage of and trade-off between harmonic (DUV) power, spatial beam quality, and nonlinear crystal lifetime. Meanwhile, a low power density on the optics may be needed to achieve the desired component lifetime.

If one or multiple of the wavelengths involved in the nonlinear wavelength conversion process are in the DUV region, the DUV-radiation is prone to cause optically induced damage not only in the nonlinear crystal, but also to other optical components in the beam shaping optics. Limiting the power density both in the crystal and on/in the beam shaping optics can become important in this case. The acceptable power density on the beam shaping optics can be considerably lower than in the nonlinear crystal itself. This requirement is in part due to material properties (e.g., in the case of fused silica) and in part due to the fact that the spot shifting schemes commonly used for nonlinear crystals cannot be applied to many optics components (e.g., spherical lenses) without introducing misalignment and aberrations into the beam path. This makes it necessary to position the beam shaping optics at a distance from the nonlinear crystal where the beam has diverged enough to reduce the optical power density to an acceptable level. Increasing the focus size in the nonlinear crystal decreases the beam divergence. The required distance from the nonlinear crystal to the beam shaping optics increases accordingly, so that the wavelength conversion module may become larger than desired.

The nonlinear crystal can be periodically shifted perpendicular to the beam, which uses multiple crystal locations. If one area of the nonlinear crystal is damaged, then the nonlinear crystal is moved relative to the beam so that the beam is projected onto a different, undamaged area. While this may prolong the period before the nonlinear crystal must be replaced, this fails to address the cause of any damage to the nonlinear crystal.

Therefore, what is needed is an improved nonlinear optical wavelength converter.

BRIEF SUMMARY OF THE DISCLOSURE

In a first embodiment, a system is provided. A system comprises a laser source, a nonlinear crystal, and a crystal mount assembly. The laser source is configured to generate a laser beam. The nonlinear crystal is configured for wavelength conversion. The nonlinear crystal is positioned such that a focus of the laser beam is outside the nonlinear crystal in at least one plane perpendicular to a beam propagation direction of the laser beam. The nonlinear crystal is disposed on the crystal mount assembly.

Beam shaping optics can be disposed between the laser source and the nonlinear crystal and/or can be disposed downstream of the nonlinear crystal in the beam propagation direction.

The crystal mount assembly can be configured to adjust a beam size of the laser beam in the nonlinear crystal by adjusting a distance between a center of the nonlinear crystal and the focus.

The nonlinear crystal can be positioned such that the focus of the laser beam is outside the nonlinear crystal in the at least one plane perpendicular to the beam propagation direction of the laser beam with a Rayleigh range configured such that time averaged fundamental optical power density or harmonic optical power density at the spatial peak of the beam profile on or in at least one optical component in the system is limited to below 1 MW/cm$^2$.

The laser beam can be a pulsed laser beam. The nonlinear crystal can be positioned such that the focus of the pulsed laser beam is outside the nonlinear crystal in the at least one plane perpendicular to the beam propagation direction of the pulsed laser beam with a Rayleigh range configured such that fundamental optical fluence power density or harmonic optical fluence on or in at least one optical component of the system is limited to below 10 J/cm$^2$.

The crystal mount assembly can include a plurality of mounting features at different distances from the laser source. The crystal mount assembly can be configured to be disposed on one of the mounting features and a beam size of the laser beam in the nonlinear crystal can be provided by selecting one of the mounting features.

Using the plurality of mounting features, the nonlinear crystal can be positioned such that the focus of the laser beam is outside the nonlinear crystal in the at least one plane perpendicular to the beam propagation direction of the laser beam with a Rayleigh range configured such that time averaged fundamental optical power density or harmonic optical power density at the spatial peak of the beam profile on or in at least one optical component in the system is limited to below 1 MW/cm$^2$.

Using the plurality of mounting features, the laser beam can be a pulsed laser beam. The nonlinear crystal can be positioned such that the focus of the pulsed laser beam is outside the nonlinear crystal in the at least one plane perpendicular to the beam propagation direction of the pulsed laser beam with a Rayleigh range configured such that the fundamental optical fluence or harmonic optical fluence on or in at least one optical component of the system is limited to below 10 J/cm$^2$.

The crystal mount assembly can be adjustable. The nonlinear crystal can be positioned such that the focus of the laser beam is outside the nonlinear crystal in the at least one plane perpendicular to the beam propagation direction of the laser beam with a Rayleigh range configured such that time-averaged fundamental optical power density or harmonic optical power density at the spatial peak of the beam profile on or in at least one optical component in the system is limited to below 1 MW/cm$^2$.

The laser beam can be a pulsed laser beam and the crystal mount assembly can be adjustable. The nonlinear crystal is positioned such that the focus of a pulsed laser beam is outside the nonlinear crystal in the at least one plane perpendicular to the beam propagation direction of the pulsed laser beam with a Rayleigh range configured such that fundamental optical fluence or harmonic optical fluence on or in at least one optical component in the system is limited to below 10 J/cm$^2$.

The focus can be at least one of circular, elliptical, or astigmatic.

The focus can be elliptical and the focus in a plane parallel to a walk-off is larger than the focus in a plane perpendicular to the walk-off.

The focus can be astigmatic such that, for example, the focus in one plane is inside the nonlinear crystal and the focus in another plane is outside the nonlinear crystal.

The focus can be astigmatic and elliptical. The focus in one plane is inside the nonlinear crystal and the focus in another plane is outside the nonlinear crystal. The focus inside the nonlinear crystal has a larger width than the focus outside the nonlinear crystal.

The system can be configured such that the wavelength conversion is one of second harmonic generation, sum-frequency generation, or difference frequency generation.

The system can further include an adjustment assembly connected to the crystal mount assembly. The adjustment assembly may be, for example, a screw with a locking mechanism.

In a second embodiment, a method is provided. The method comprises generating a laser beam; directing the laser beam at a nonlinear crystal configured for wavelength conversion; and nonlinearly converting the laser beam. The nonlinear crystal is positioned such that a focus of the laser beam is outside the nonlinear crystal in at least one plane perpendicular to a beam propagation direction of the laser beam. The nonlinear conversion of the laser beam can be one of second harmonic generation, sum-frequency generation, or difference frequency generation.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
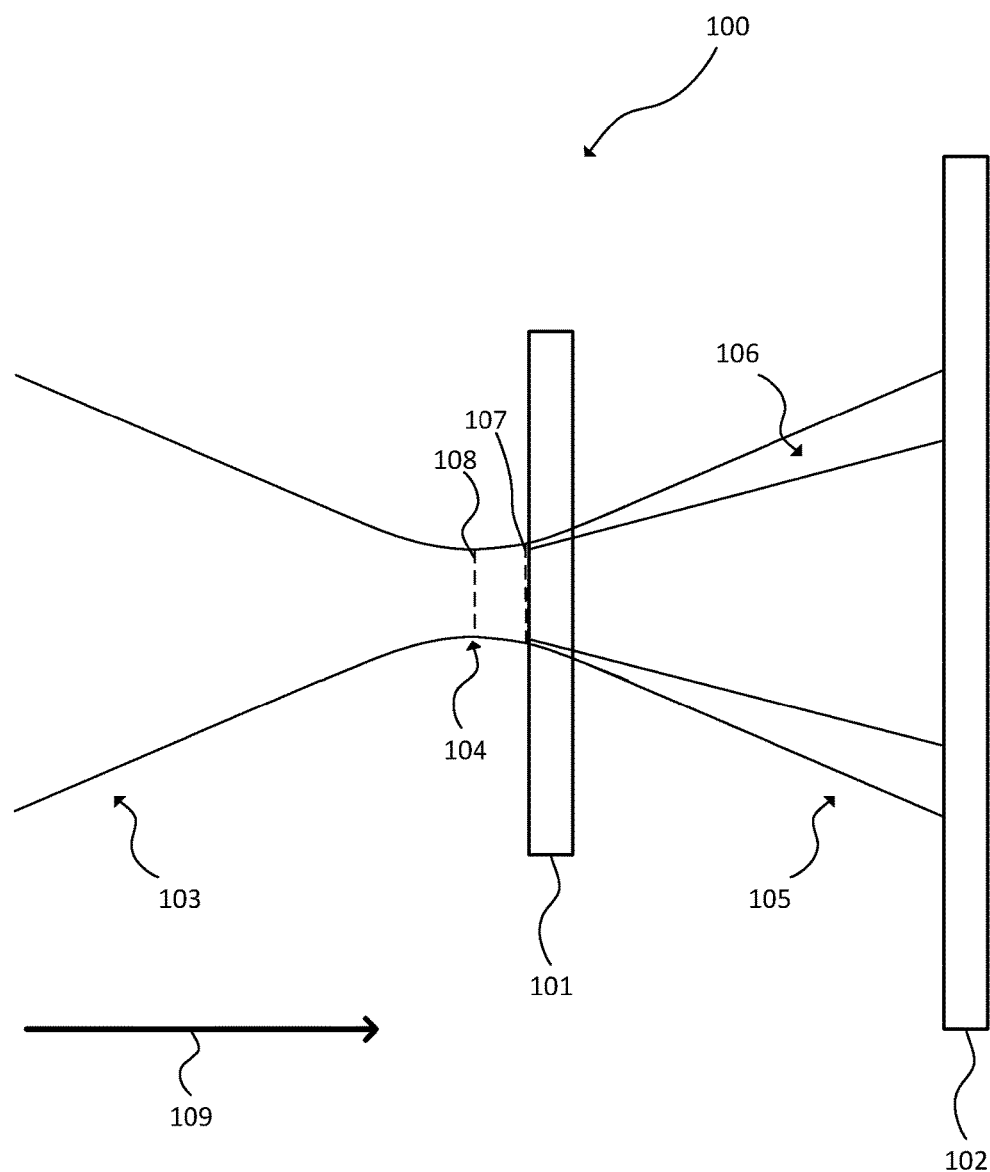
FIG. 1 is a schematic diagram illustrating an embodiment of a wavelength converter in accordance with the present disclosure.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

The improved nonlinear optical wavelength converters disclosed herein introduce a degree of freedom to independently optimize the beam sizes, and, thus, the power densities both in the nonlinear crystal and on the adjacent optical elements of the beam shaping optics. In contrast to other wavelength converter devices, this optimization can be achieved without increasing the form factor of the device. Even for relatively large beam sizes inside the crystal, the beam divergence angle can be made large to reduce the power density on the downstream optics. In addition, the beam size inside the nonlinear optical crystal can be adjusted as needed to scale the harmonic power with minimal changes to the optics design.

The disclosure comprises a compact design for a nonlinear optical wavelength converter that improves the optical performance as well as the component lifetime. The disclosure allows an optics designer to independently optimize the optical power density in or on the nonlinear crystal and other components of the beam shaping optics. This is achieved by locating the nonlinear crystal outside the focus of the fundamental beam. Furthermore, the power density inside the nonlinear crystal can be scaled via the beam size without redesigning the wavelength converter optics train by adjusting the out-of-focus position of the nonlinear crystal. Due to this feature, an optimal power density in the nonlinear crystal can be maintained when increasing the harmonic power.

Nonlinear crystals can be used to create a UV laser beam by generating a harmonic of a long wavelength beam or by mixing two laser beams of different frequencies to create a frequency equal to the sum (or difference) of the two frequencies. Thus, nonlinear wavelength conversion, such as sum-frequency generation (SFG) and second harmonic generation (SHG) in nonlinear optical crystals, can generate laser radiation at wavelengths not directly accessible through the emission lines of efficient solid state laser sources. This method can, for example, be used to extend the wavelength range of diode-pumped solid-state lasers, emitting in the near infrared, into the visible, UV, and DUV. UV and DUV generation is typically achieved by cascading two or multiple SHG and SFG steps. The third harmonic (THG) is, for example, generated by an SHG process followed by an SFG process, whereas the fourth harmonic (FHG) is generated in two cascaded SHG processes. Because the harmonic generation and the mixing process are non-linear processes, higher incident power density typically results in a more efficient conversion process and higher output power.

In order to achieve efficient wavelength conversion in, for example, an SHG process, the dispersion between the fundamental and second harmonic is minimized. This can be achieved by choosing the propagation direction in a birefringent nonlinear crystal (i.e., the phase-matching angle) so that the ordinary refractive index at the fundamental wavelength matches the extraordinary refractive index at the second harmonic wavelength or vice versa. For most phase matching angles, the pointing vector of the second harmonic beam inside the nonlinear crystal is not parallel to the wave vector. This condition is commonly referred to as critical phase matching. The pointing vector walk-off ("walk-off") can be taken into account for any nonlinear wavelength converter design, so that any detrimental impact on the spatial beam quality can be minimized.

The small signal gain in SHG is proportional to the square of the fundamental power density. A Gaussian beam is focused into the nonlinear crystal to maximize the power density throughout the crystal and achieve maximal conversion efficiency.

The optimal focus size depends on both, the length of the nonlinear crystal and its walk-off angle. In case of critical phase matching the nonlinear conversion efficiency can be further increased by choosing an elliptical focus with a larger waist in the plane of the walk-off. In addition to achieving higher conversion efficiency, elliptical focusing can be used to reduce the impact of the walk-off on the spatial beam quality. A software package to optimize the focusing conditions for both circular and elliptical focusing can be used.

In high-power applications, both the power and the spatial beam quality of the second harmonic can be negatively impacted by detrimental effects introduced by the high power density (e.g., nonlinear absorption, thermal dephasing, and photorefraction). Furthermore, the high power density in the nonlinear material can induce the formation of crystal defects (such as excitons and color centers), photorefractive damage, and optically induced surface damage. These effects can result in a degradation of the nonlinear crystal quality over time. The effects are especially prominent when the photon energy of the radiation is large enough to allow for two-photon absorption in the material. Depending on the nonlinear material that is used, this may be the case for radiation in the visible, UV, or DUV. Increasing the focus size inside the crystal can reduce the power density. As this method reduces the conversion efficiency as well, a trade-off has to be made between nonlinear conversion efficiency, spatial beam quality, and longevity of the nonlinear crystal. In the case of critical phase matching, elliptical focusing generally yields an increased conversion efficiency and improved beam quality at a given power density.

If the focus on the fundamental beam is located in the center of the nonlinear crystal, then the focus size of the fundamental beam must be increased to increase the beam size in the nonlinear crystal. Thus, the fundamental focusing and harmonic beam shaping optics would need to be redesigned. If the form factor of the device is to remain unchanged, then the beam size on focusing and beam-shaping optics elements decreases. This increases the power density on the optics and, consequently, decreases lifetime of the optics.

Increasing the incident laser power on a nonlinear crystal can have undesirable side effects. For example, permanent damage may occur in the crystal over time. With accumulated exposure, this damage can result in generally decreasing power intensity as well as generally increasing astigmatism. Therefore, correcting the astigmatism with optics may require frequent compensating adjustments, which would be impractical in commercial applications. Moreover, the astigmatism also may rapidly increase to the level where accurate compensation is not possible even with adjustment.

Generating a shorter output wavelength also can accelerate the degradation of the crystal because the output photons are more energetic and, therefore, can change characteristics of or even permanently damage the crystal. Thus, at shorter output wavelengths, astigmatism and other adverse beam quality and intensity effects also may increasingly occur.

When scaling the harmonic power (e.g., by increasing the fundamental power as a higher-power fundamental laser source becomes available), the trade-off between optical power, spatial beam quality, and crystal lifetime may not be optimized, so that the beam size in the nonlinear crystal has to be re-optimized. The focus size in the nonlinear crystal may need to be changed to re-optimize. This can require a major optical and optomechanical redesign of the nonlinear wavelength converter module.

FIG. 1 is a schematic diagram illustrating an embodiment of a wavelength converter 100. The wavelength converter 100 includes a nonlinear crystal 101 and beam shaping optics 102. The beam shaping optics 102 can include one or more lenses, mirrors, or other optical components. An additional beam shaping optics (not illustrated), which also can include one or more lenses, mirrors, or other optical components, may be positioned on the opposite side of the nonlinear crystal 101 from the beam shaping optics 102.

A laser beam 103 is projected at the nonlinear crystal 101. The laser beam 103 has a focus 104 that is outside the nonlinear crystal 101 in at least one plane perpendicular to a beam propagation direction 109 of the laser beam 103. For example, this plane may be parallel to the dashed lines representing the beam size 108. The distance between the center of the nonlinear crystal 101 and the focus 104 can be set or adjusted.

The focus 104 of the laser beam 103 is chosen to be small enough, and, thus, the beam divergence large enough, so that the fundamental and/or harmonic power density on one or multiple optical elements downstream or upstream of the focus 104 remains low enough to ensure a sufficient component lifetime for the intended application (e.g., longer than one year or other periods of time). Depending on the wavelength of fundamental and harmonic radiation and the material properties of the component, the maximal allowable power density may be in a range from 100 W/cm$^2$ to 1 MW/cm$^2$, including all values to the 1.0 W/cm$^2$ and ranges therebetween.

For any given Gaussian or near-Gaussian beam, the beam diameters, measured along two mutually perpendicular axes x and y, both also being perpendicular to the beam propagation direction 109, are functions of the distance (z−z0) to the focus locations, as seen in Equation 1 and Equation 2

$$w_x(z) = w0_x * \sqrt{1 + \left(\frac{M^2\lambda(z-z0_x)}{\pi w0_x^2}\right)^2} \quad \text{Eq. 1}$$

$$w_y(z) = w0_y * \sqrt{1 + \left(\frac{M^2\lambda(z-z0_y)}{\pi w0_y^2}\right)^2} \quad \text{Eq. 2}$$

with 2*w(z) being the beam diameter at the location z, defined as 4× the standard deviation of the power distribution across the beam profile, 2*w0 being the beam waist diameter, z0 being the beam waist location in the direction of beam propagation, λ being the wavelength of the radiation, and $M^2$ being the beam propagation parameter. The time-averaged fundamental power density $D_F$ at the spatial peak of the beam profile can be calculated as a function of the beam radii, as seen in Equation 3

$$D_F(z) = \frac{2P_F}{\pi w0_x w0_y} \quad \text{Eq. 3}$$

with $P_F$ being the time-averaged fundamental power. If, for example, the nonlinear optical process is second harmonic generation, the beam sizes and the power density of the harmonic beam and the conversion efficiency for a given crystal position can be calculated based on the fundamental beam sizes described in Equations 1 and 2. In the presence of walk-off this can be achieved by using a numeric simulation of the harmonic generation for focused Gaussian beams. Similar numerical models are available for other nonlinear optical wavelength conversion processes. The crystal position z and thus the beam size can be chosen so that the fundamental power density remains high enough to achieve the desired conversion efficiency and harmonic output power, while, within the limits of this boundary condition, both fundamental and harmonic power densities are minimized, so that the spot lifetime of the nonlinear crystal 101 is maximized. Typical distances between a position of the focus 104 and a location of the nonlinear crystal 101 range from millimeters to tens of centimeters. However, other distances are possible.

In an example, the power of the harmonic radiation with a wavelength of 266 nm, generated in a nonlinear crystal 101, such as BBO, is doubled while fundamental and harmonic power density in the nonlinear crystal 101 remain unchanged. Under these conditions the crystal spot lifetime remains unchanged as well. This can be achieved by doubling power of the fundamental laser(s), as well as the beam area inside the nonlinear crystal 101. For example, an elliptical fundamental beam size of 450 μm×200 μm may be increased to 450 μm×400 μm. In this example the major axis of the ellipse is parallel to the walk-off. The beam size in the nonlinear crystal 101 can be increased by increasing the size of a focus located inside the nonlinear crystal 101. As a result the beam area on a downstream optics at a distance of, for example, 0.5 m decreases by a factor of 1.8×, so that the harmonic power density on or in the optics increases by a factor of 3.6×. If the downstream optics experiences a damage mechanism, which scales with the square of the DUV power density, the optics lifetime decreases by a factor of more than 10×.

When using the embodiments disclosed herein, the same DUV power and DUV power density in the nonlinear crystal 101 can be achieved by maintaining the original focus size and position and moving the nonlinear crystal 101 downstream of the focus 104 by 0.1 m. As there is no change to the focus size, the fundamental and harmonic beam sizes on the downstream mirror remain the same (in the absence of secondary effects such as thermal lensing), so that the DUV power density on the mirror increases only by a factor of 2×, resulting in less of an impact to optics lifetime. This is a significant improvement over previous systems. The distance the nonlinear crystal 101 is moved upstream or downstream of the focus 104 can vary, and moving the nonlinear crystal 101 downstream of the focus 104 by 0.1 m is merely one example.

The nonlinear crystal 101 can be configured to provide phase matching to achieve efficient nonlinear interactions in a medium. The nonlinear crystal 101 may utilize critical phase matching, noncritical phase matching, quasi-noncritical phase matching, or quasi-phase matching.

The nonlinear crystal 101 may be or include BBO or $CsLiB_6O_{10}$ (CLBO) for DUV applications. However, other types of nonlinear crystals may be used, such as those that are or include $LiIO_3$, $KNbO_3$, monopotassium phosphate ($KH_2PO_4$), lithium triborate (LBO), GaSe, potassium titanyl phosphate (KTP), lithium niobate ($LiNbO_3$), $LiIO_3$, or ammonium dihydrogen phosphate (ADP).

Nonlinear crystals, such as the nonlinear crystal 101, are typically grown in boules, and then cut into individual crystal elements. The input and output surface are polished after cutting. The dimensions of the available crystal elements depend on the properties, such as boule size and boule quality, of the chosen nonlinear optical material. Nonlinear optical crystals may have length dimensions from 1 mm to 50 mm, width dimensions from 3 mm to 20 mm, and height dimensions from 0.5 mm to 10 mm, including all values to the 0.01 mm and ranges therebetween. The direction of beam propagation, such as beam propagation direction 109, is typically referred to as a "length." Other nonlinear crystal dimensions are possible for different applications. A nonlinear crystal 101 of any size suitable for a desired application can be used in the embodiments disclosed herein.

As seen in FIG. 1, the beam size 107 (represented with dashed lines) at or in the nonlinear crystal 101 is greater than the beam size 108 (represented with dashed lines) at the focus 104 because the nonlinear crystal 101 is positioned downstream of the focus 104. The power density at the beam size 107 is less than the density at the beam size 108. Thus, the nonlinear crystal 101 is affected by part of the laser beam 103 with a lower power density.

The beam size 107 inside the nonlinear crystal 101 can be optimized by adjusting the position of the nonlinear crystal 101 outside the focus 104. When using techniques disclosed herein, changes to the size and location of the focus 104 of the laser beam 103 can be avoided. As the waist size and location of the focus 104 can remain unchanged, the beam size on the beam shaping optics 102 downstream of the nonlinear crystal 101 may remain unchanged. More particularly, the beam size on the beam shaping optics 102 downstream of the nonlinear crystal 101 may not decrease.

Downstream of the nonlinear crystal 101, the laser beam 103 includes a fundamental beam 105 and a harmonic beam 106. While the harmonic beam 106 is illustrated in a particular manner in FIG. 1, the beam sizes of the harmonic beam 106 may be smaller than the fundamental beam sizes 105 by a factor of 1.41× (i.e., √2).

The wavelength converter 100 can use a divergent or convergent beam inside the nonlinear crystal 101. In one plane (parallel or perpendicular to the walk-off) or in both planes, the fundamental beam 105 is focused outside the crystal as shown in FIG. 1. The size of the focus 104 can be chosen so that it provides a short enough Rayleigh range, and, thus, a large enough beam divergence to reduce the power density on the beam shaping optics 102 to a level that provides the desired optics lifetime. In this case, the Rayleigh range is the distance along the beam propagation direction 109 from the waist to the place where the beam width is increased by a factor of $\sqrt{2}$. If power scalability is intended for the wavelength converter 100, the beam size on the beam shaping optics 102 is chosen to be large enough so that the required maximum power density on the beam shaping optics 102 is not exceeded for the highest intended fundamental and harmonic powers that will be present in a power-scaled version of the wavelength converter. To avoid any power and/or beam quality penalty in the case of critical phase matching, the beam divergence (or convergence) within the nonlinear crystal 101 in the plane parallel to the walk-off, may remain below the limit set by the crystal angular acceptance. The margin depends on the specific beam quality requirement for an application.

The divergence or convergence of a laser beam can be described by Gaussian beam propagation. The beam divergence parallel to a given lateral axis at a given position z along the beam propagation direction is the arctangent of the first derivative of Equations 1 and 2. Therefore, the divergence angle at a given location can be decreased by increasing the waist size. The acceptance angle of the nonlinear process is defined as the angle offset from the optimum phase-matching angle in the critical direction of phase matching, for which the nonlinear conversion efficiency is reduced to 50% of the conversion efficiency at the optimal phase matching condition. Typical values of the angular acceptance, which is defined as a half angle herein, for harmonic generation into the DUV are on the order of 0.05 to 0.5 mrad*cm of crystal length. The acceptance angle can depend on the nonlinear process, the nonlinear crystal material being used, and the length of the nonlinear crystal. The acceptance angle can be calculated based on the Sellmeier equations for the nonlinear crystal material. Alternatively a software package can be used to calculate the angular acceptance. In order to reduce the conversion efficiency loss due to the beam divergence angle to less than 4%, the beam divergence angle, defined as 2× the standard deviation to the angular laser power distribution, in the critical direction of phase matching may be limited to less than 50% of the acceptance angle as defined above.

The nonlinear crystal 101 position along the axis of the beam propagation direction 109 can be chosen so that the power density in the nonlinear crystal 101 meets the requirements needed to achieve the desired trade-off between one or more of or between two or more of conversion efficiency, spatial beam quality, crystal lifetime, or crystal spot lifetime.

For nonlinear wavelength conversion, the conversion efficiency increases with increasing power density, so that an as small as possible beam size in the nonlinear crystal 101 may be desirable to maximize the conversion efficiency. On the other hand, the nonlinear crystal 101 may experience damage induced by the generated harmonic or even by the fundamental radiation, so that crystal spot used for wavelength conversion has a limited lifetime. The exact scaling laws can depend on the specific damage mechanism experienced by the crystal. However, the crystal lifetime decreases with increasing power density, so that an as large as possible beam size in the crystal may be desirable to maximize the spot lifetime.

A nonlinear crystal spot shift may trigger a service-event for the wavelength converter, so maintaining a large enough spot lifetime (e.g., in the range of several hundreds of hours or longer) can achieve the desired service interval. The crystal lifetime, as a whole, is the sum of the spot lifetimes for all crystal spots. If the spot lifetime decreases linearly with decreasing spot size (i.e., increasing power density), the crystal lifetime becomes independent of the spot size, as the number of available spots increases at the same rate as the individual spot lifetime decreases. For damage mechanisms that follow a scaling law, which is faster than linear (e.g., a spot lifetime that decreases inversely proportional to the square of the power density), increasing the beam size improves the crystal lifetime because the number of available spots decreases linearly with the increasing beam area, whereas the lifetime of the individual crystal spots increases faster than linearly with increasing spot size (e.g., proportional to the square of the beam area in the above example).

The nonlinear crystal 101 provides wavelength conversion of the laser beam 103. The optimal beam size in the nonlinear crystal 101 can be chosen to maximize the achievable conversion efficiency, and, thus, maximize the power at the harmonic wavelength, while maintaining a required spot lifetime and/or crystal lifetime. Alternatively, the optimal beam size in the nonlinear crystal 101 may be chosen to maximize the achievable spot lifetime and/or crystal lifetime while achieving the conversion efficiency and, thus, the power at the harmonic wavelength that is required for an application.

The wavelength converter 100 enables scaling of the second harmonic power by increasing the fundamental power from the primary laser source used to generate the laser beam 103. The optimum power density can be maintained by moving the nonlinear crystal 101 farther away from the focus 104. Changes to the fundamental focusing optics design may not be needed. Minor changes in the harmonic beam shaping optics may still be performed to compensate for possible effects induced by the different positions of the nonlinear crystal 101 and beam size in the nonlinear crystal 101. For example, the changed location and power of a possible thermal lens inside the crystal may be compensated for. However, these changes are minor compared to a complete redesign of the wavelength converter optics train. Such changes can be accommodated by taking advantage of adjustable beam shaping components for the harmonic beam, such as an adjustable beam expanding telescope or a Cooke triplet, in the downstream beam shaping optics 102.

In an instance, a focus 104 for a particular nonlinear crystal 101 that places the nonlinear crystal 101 outside the focus 104 and provide a laser beam 103 with desired parameters can be determined in a two-step process. First, the fundamental beam size in the nonlinear crystal 101, as a function of the nonlinear crystal 101 location, can be determined by using the techniques disclosed herein. Second, the harmonic beam size can be calculated based on the fundamental beam size. Using these calculations the distance between the focus 104 and the nonlinear crystal 101 can be chosen so that the fundamental and harmonic power densities meet specifications for a particular application.

Figure 2:
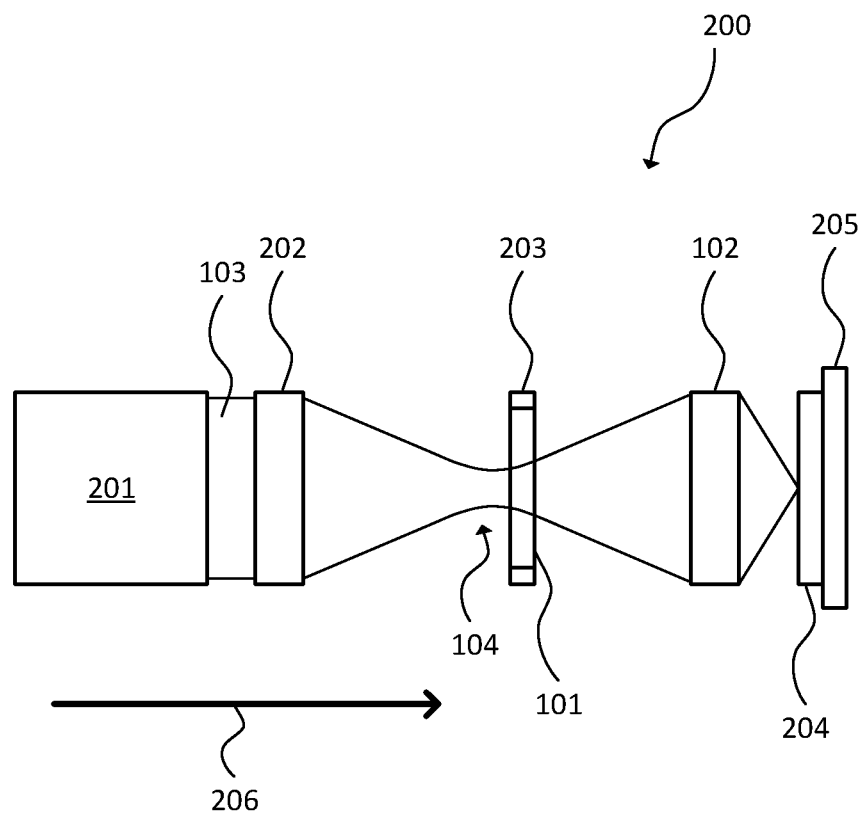
FIG. 2 is a schematic diagram illustrating a first embodiment of a system in accordance with the present disclosure.

FIG. 2 is a schematic diagram illustrating an embodiment of a system 200. A laser source 201 containing a laser active medium generates fundamental radiation, such as the laser beam 103, in the beam propagation direction 206. The laser source 201 may be, for example, a solid state laser, semiconductor laser, gas laser, fiber laser, CW laser, mode-locked laser, Q-switched laser, gain-switched laser, laser with a built-in nonlinear wavelength converter, or another type of laser. The laser beam 103 emitted by the laser source 201 may be a diffraction-limited or near diffraction-limited Gaussian beam. Other types of laser beams 103 are possible.

In an instance, the laser source 201 is an exchangeable laser source. An exchangeable laser source that is part of the nonlinear optical system can be exchanged with a laser source of identical design as a field replaceable unit upon its failure or once it reaches the end of its service lifetime. An exchangeable laser source that is part of the nonlinear optical system also can be exchanged with a laser source of a different design, such as a higher power laser source, to improve the performance (e.g., the output power of the nonlinear optical system). In this case, the out-of-focus position of the nonlinear crystal 101 can be adjusted, as described herein, to achieve an optimal trade-off between harmonic power and lifetime of the nonlinear crystal 101.

The laser beam 103 projects through beam shaping optics 202 upstream of the nonlinear crystal 101. The beam shaping optics 202 can include one or more lenses, mirrors, or other optical components. The beam shaping optics 202 may comprise a single lens or multiple lenses and may generate a circular or elliptical focus with or without astigmatism. The beam shaping optics 202 may or may not be adjustable. The beam shaping optics 202 may be located between the laser source 201 and the nonlinear crystal 101 or may be integrated into the laser source 201. A focus 104 of the laser beam 103 is outside the nonlinear crystal 101 in at least one plane perpendicular to a beam propagation direction 206 of the laser beam 103. The location and size of the focus 104 can vary. Typical focus diameters may range from 5 µm to approximately 1 mm, including all values to the 1 µm and ranges therebetween. Typical distances between the focus 104 position and the nonlinear crystal 101 range from millimeters to tens of centimeters. However, focus 104 sizes and distances to the nonlinear crystal 101 outside of this range are possible.

The nonlinear crystal 101 is disposed in a crystal mount assembly 203. Thus, the nonlinear crystal 101 may be on or in the crystal mount assembly 203. The crystal mount assembly 203 may be fabricated of metal such as, but not limited to, aluminum, stainless steel, copper, copper-tungsten, or nickel. The crystal mount assembly 203 also may be fabricated of ceramics or other materials.

The crystal mount assembly 203 can be designed to keep the position of the nonlinear crystal 101 stable within, for example, tens of microns and the angle relative to the incident laser beam stable within, for example, 27% of the angular acceptance range during shipment and operation of the nonlinear wavelength converter. An angle change of 27% of the angular acceptance in the walk-off direction can result in a 5% drop of the conversion efficiency relative to the optimal phase matching angle.

The crystal mount assembly 203 may be a spring-loaded assembly, wherein the nonlinear crystal 101 is positioned in an L-bracket and held in place by springs along one or multiple axes perpendicular to the beam propagation direction 109. The springs press the nonlinear crystal 101 onto or against the L-bracket.

Due to the limited angular acceptance of the nonlinear optical interaction, the angle tolerance may be in the range from 0.03 mrad to 0.3 mrad. Therefore, the crystal mount assembly 203 may contain features to adjust the phase matching angle of the nonlinear interaction. Such features include, but are not limited to rotation stages actuated by a manual fine thread screws, manual micrometer actuators, manual differential micrometer actuators, or motorized actuators. The entire crystal mount assembly 203 may be rotated during the adjustment of the crystal phase matching angle. The crystal mount assembly 203 may contain a locking mechanism to lock the rotation angle of the nonlinear crystal 101 once the alignment is completed. Such locking mechanisms include, but are not limited to, screws that are tightened in a direction perpendicular to the direction of rotation to press the rotating part of the stage against a surface providing sufficiently high friction. For nonlinear crystals 101 with typical dimensions, the size of the crystal mount assembly 203 is typically in the range from 10 mm to 150 mm in either direction. Other dimensions of the crystal mount assembly 203 are possible and these ranges are merely exemplary.

In addition the crystal mounting assembly may contain manual or motorized translation stages so that the nonlinear crystal 101 can be moved perpendicular and/or parallel to the beam propagation direction 109.

The crystal mount assembly 203 can be temperature controlled. In addition to angular alignment, the phase matching condition is sensitive to the temperature of the nonlinear crystal 101 because the refractive indices at the fundamental and the harmonic wavelength have different temperature dependences. The temperature acceptance can be defined as the temperature range around the optimal phase matching temperature in which the nonlinear optical conversion efficiency is higher than 50% of the conversions efficiency at the optimal phase matching temperature. Typical temperature acceptance ranges for nonlinear crystals used to generate DUV radiation are on the order of 6° C.*cm of crystal length. To maintain a conversion efficiency larger than 95% of the value at optimal phase matching temperature, it may be necessary to maintain the crystal temperature in a range less than 25% of the temperature acceptance (i.e., within a range of 1.5° C.*cm of crystal length). To keep the crystal temperature in the described optimal range, the crystal temperature may be actively controlled. This can be achieved by using a temperature controller including a sensor, such as, but not limited to, a thermocouple, a thermistor, or an RTD temperature sensor, to measure the temperature. The temperature controller also can include a heater or a Peltier element electronically connected to the sensor to adjust the temperature. Both the sensor and temperature controller can be integrated in or attached to the crystal mount assembly 203. The temperature controller also may include a proportional-integral-derivative (PID) controller to establish a temperature control loop.

The crystal mount assembly 203 can contain a crystal enclosure and/or a crystal oven. Several nonlinear crystal materials, including LBO, CLBO, and LiIO$_3$, are highly hygroscopic. It can be advantageous to protect such nonlinear crystals from environmental humidity using an enclosure. The enclosure may be hermetically sealed or actively purged with a dry purge gas, such as nitrogen, argon, or clean, dry air. The enclosure body may be made of metal or ceramics. The enclosure has two windows to allow for the entry of the fundamental laser beam and an exit of both the fundamental and harmonic beam. The windows may comprise a substrate material transmitting both the fundamental and harmonic wavelength. Possible window materials include, but are not limited to, fused silica, calcium fluoride, magnesium fluoride, or crystalline quartz. The interface between the body of the enclosure and the windows may be sealed using a seal, such as an O-ring seal or other types of seals. The crystal enclosure may include a crystal oven or a temperature controlled crystal mount.

To minimize humidity exposure of hygroscopic crystals, the crystal may be operated at an elevated temperature to minimize the risk of condensation of environmental humidity on the crystal surfaces. The elevated temperature may be, for example, from 40° C. and 200° C. The crystal may be heated using a crystal oven. The oven body may be fabricated of metal (e.g., aluminum or copper) or of ceramics. The design may be similar to the temperature controlled crystal mount described herein. Features may be added to optimize the oven for high temperature operation, such as resistive heaters that are optimized for high-temperature operation, or thermal insulating features to improve the homogeneity of the temperature distribution inside the oven. Such insulating features may include thermal insulation layers (e.g., those including ceramics or fluoropolymers).

The crystal mount assembly 203 can be configured to allow exchange of the nonlinear crystal 101 as it reaches the end of its lifetime.

The crystal mount assembly 203 is at a location along the beam propagation axis 206 so that the focus 104 in at least one of the planes perpendicular to the beam propagation axis 206 is outside of the nonlinear crystal 101. The crystal mount assembly 203 can be fixed or can be translatable perpendicular and/or parallel to the beam propagation direction 206. In the embodiment of FIG. 2, the crystal mount assembly 203 is attached or fixed to a wall of the system 200 at a desired location.

The laser beam 103 passes through the beam shaping optics 102 downstream of the nonlinear crystal 101. The beam shaping optics 102 can include one or more lenses, mirrors, or other optical components. The beam shaping optics 102 may or may not be adjustable.

In an instance, the beam shaping optics 102 are or include beam shaping optics for the harmonic beam generated in the nonlinear crystal 101. This harmonic beam shaping optics may include adjustable optical elements and/or adjustable optomechanical elements.

In an example, the laser beam 103 is used to image a wafer 204 disposed on a stage 205. However, the laser beam 103 can be used in other applications or with other workpieces.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Figure 3:
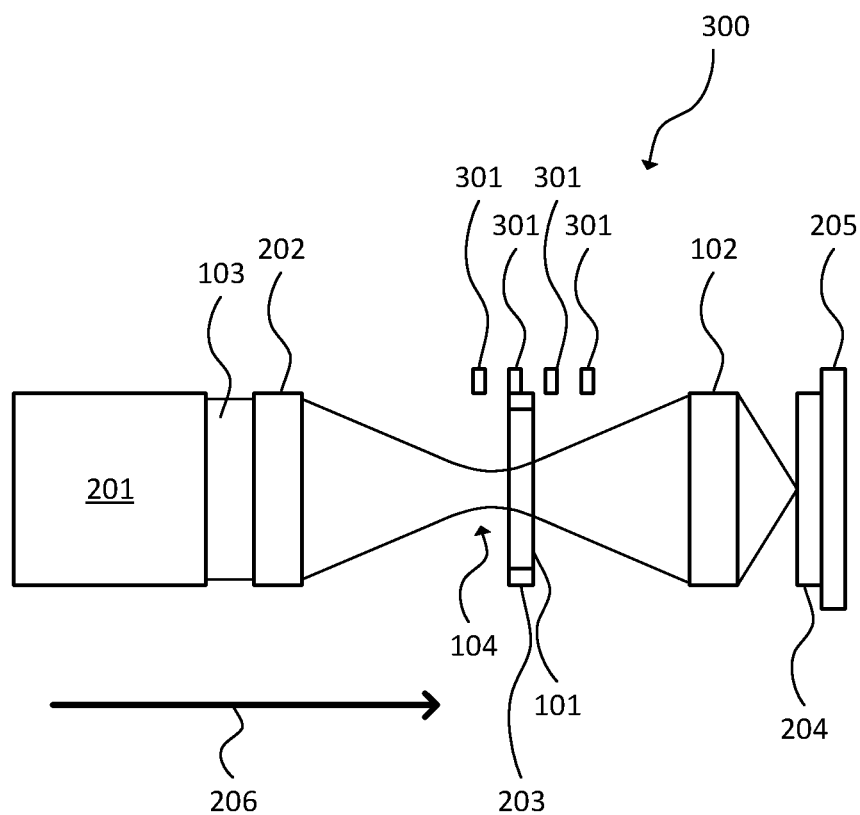
FIG. 3 is a schematic diagram illustrating a second embodiment of a system in accordance with the present disclosure.
Figure 4:
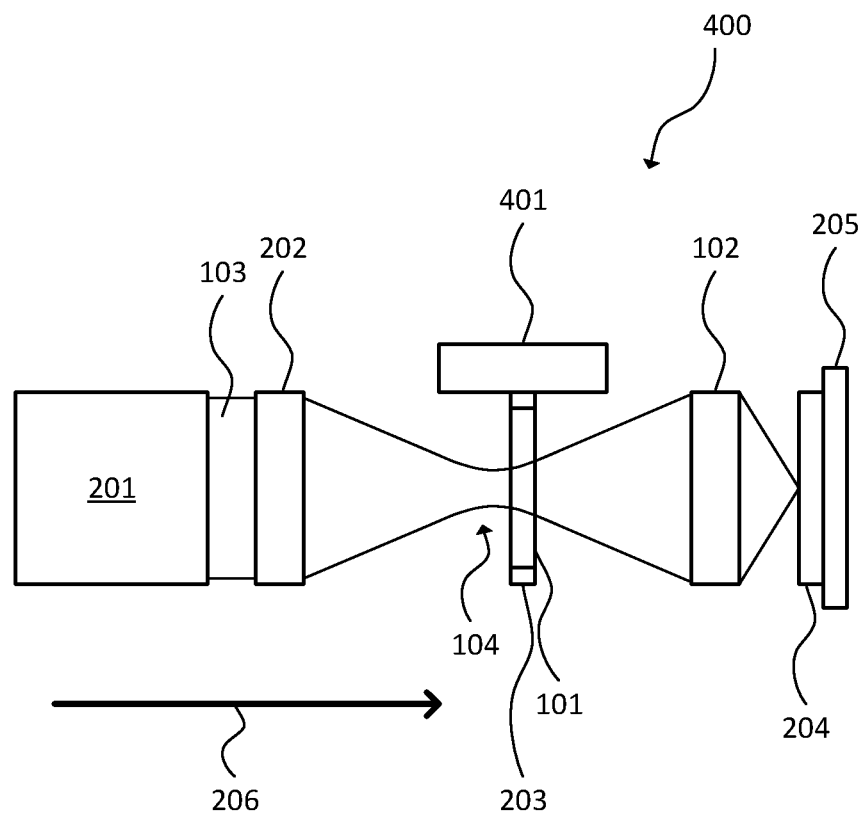
FIG. 4 is a schematic diagram illustrating a third embodiment of a system in accordance with the present disclosure.

As seen in FIGS. 3 and 4, the crystal mount assembly 203 may be configured so that the crystal mount assembly 203 can be positioned in one or multiple locations outside the fundamental focus, so that fundamental beam size can be adjusted to achieve an optimal trade-off between conversion efficiency, spatial beam quality, crystal lifetime, or crystal spot lifetime without having to change the alignment of the beam shaping optics 102, 202. Thus, the crystal mount assembly 203 can be configured to adjust a distance between a center of the nonlinear crystal 101 and the focus 104.

FIG. 3 is a schematic diagram illustrating an embodiment of a system 300. The system includes one or more mounting features 301. While four mounting features 301 are illustrated in FIG. 3, more or fewer mounting features 301 are possible. These mounting features 301 may be arranged in an array. The mounting features 301 are arranged at different distances from the laser source 201 or between the beam shaping optics 102, 202. The crystal mount assembly 203 is configured to be disposed on or in one of the mounting features 301. A beam size of the laser beam 103 in the nonlinear crystal 101 is provided by selecting one of the mounting features 301 closer to or farther from the focus 104. Thus, the mounting features 301 are configured to adjust a beam size of the laser beam 103 in the nonlinear crystal 101 by allowing adjustment of a distance between a center of the nonlinear crystal 101 and the focus 104.

In an example, each of the mounting features 301 includes one or more slots or holes configured to receive a component of the crystal mount assembly 203. Each of the mounting features 301 can be positioned such that the focus 104 is outside the nonlinear crystal 101 in at least one plane perpendicular to a beam propagation direction 109 of the laser beam 103. For example, the mounting feature 301 can be a fastener hole that the crystal mount assembly 203 is fastened into. The crystal mount assembly 203 can be screwed into the mounting feature in an instance.

Different beam sizes in the nonlinear crystal 101 can be generated by moving the crystal mount assembly 203 to different locations downstream or upstream of the smaller focus in the non-walk-off direction. With the system 300, the ability to adjust the beam size in the nonlinear crystal 101 simplifies power scaling the DUV light source, such as when higher power laser sources 201 and/or nonlinear crystals 101 with improved material quality are available. The focus 104 can be outside the nonlinear crystal 101 with a Rayleigh range configured to limit fundamental optical power density or harmonic optical power density on or in at least one optical component in the system and/or to optimize the beam size inside the nonlinear crystal 101.

FIG. 4 is a schematic diagram illustrating an embodiment of a system 400. The crystal mount assembly 203 is configured to adjust a beam size of the laser beam 103 in the nonlinear crystal 101 by adjusting a distance between a center of the nonlinear crystal 101 and the focus 104 using adjustment assembly 401. The adjustment assembly 401 is connected to the crystal mount assembly 203. The adjustment assembly 401 can provide additional degrees of freedom, accuracy, and/or precision relative to the configurations of FIG. 2 or FIG. 3. The adjustment assembly 401 can move the crystal mount assembly 203 in one, two, or three axes.

The adjustment assembly 401 can be, for example, a fine-thread screw with a locking mechanism, a micrometer screw with a locking mechanism, an actuator, or a robotic system. The fine-thread screw or micrometer screw may be hand-actuated or automated.

The embodiments disclosed herein can contain power sensors and components to implement a control loop for the harmonic power. This may be, for example, a light loop. Such a control loop may use one or more components, such as polarizers, waveplates, acousto-optic modulators, electro-optic modulators in the path of the fundamental or the harmonic beam, or an electronic feedback to the laser source 201 to control the fundamental or the harmonic power.

The control loop can keep the harmonic output power constant. To achieve this, the harmonic power can be measured near the beam output using a sensor, such as a photodiode, a thermopile sensor, or other types of sensors. The control loop compares the measured harmonic output power with the power target and adjusts the harmonic output power accordingly. This adjustment can be achieved in different manners.

The harmonic power can be adjusted directly by using a modulator in the harmonic beam path downstream of the nonlinear crystal 101. Suitable modulators include, but are not limited to, acousto-optic modulators, electro-optic modulators, as well as variable attenuators comprising a combination of a rotatable half-wave-plate and a polarizer.

Alternatively the modulators can be located in the fundamental beam path upstream of the nonlinear crystal 101.

The temperature of the nonlinear crystal 101 may be adjusted to tune or detune the phase matching, and, thus, adjust the nonlinear conversion efficiency and the output power.

The control signal may be communicated back to the laser source, so that the laser output power can be adjusted in order to adjust the generated harmonic power.

In any embodiment disclosed herein, the nonlinear crystal 101 can be repositioned or adjusted within the crystal mount assembly 203 and/or the crystal mount assembly 203 can be repositioned relative to the laser beam 103 so that a non-damaged part of the nonlinear crystal 101 receives the laser beam 103 if the nonlinear crystal 101 is damaged. For example, the crystal mount assembly 203 and/or the nonlinear crystal 101 can be moved in one or two directions perpendicular to the beam propagation direction 206. The focus 104 can be outside the nonlinear crystal 101 with a Rayleigh range configured to limit fundamental optical power density or harmonic optical power density on or in at least one optical component in the system and/or to optimize the beam size inside the nonlinear crystal 101.

The nonlinear crystal 101 can be positioned in a laser beam 103 that is divergent in the axis perpendicular to the walk-off or in both axes. For a given beam size in the center of the nonlinear crystal 101, this reduces the power density on the crystal output facet and may increase the crystal spot lifetime.

A focus in the embodiments disclosed herein may be circular or elliptical. An elliptical focus may have a longer Rayleigh range in one direction than in another direction, which makes the beam size change a function of the nonlinear crystal 101 distance from the focus 104 less sensitive in the direction of the longer Rayleigh range than in the direction of the shorter Rayleigh range. With an elliptical focus, the smaller waist of the elliptical focus can be located outside the nonlinear crystal 101. For a nonlinear crystal 101 with critical phase matching, an elliptical focus with a larger waist diameter in the plane parallel to the walk-off direction can be used so that the focus in the plane parallel to the walk-off can be larger than the focus in the plane perpendicular to the walk-off.

The focus also may be astigmatic. With an astigmatic focus, the focus in one plane can be inside the nonlinear crystal 101 and the focus in another plane is outside the nonlinear crystal 101.

In an example, the focus is astigmatic and elliptical. In this example, the focus in one plane is inside the nonlinear crystal 101 and the focus in another plane is outside the nonlinear crystal 101. The focus inside the nonlinear crystal 101 has a larger width than the focus outside the nonlinear crystal 101.

In an example, the laser beam 103 is diffraction limited or near-diffraction-limited and a nonlinear crystal 101 with critical phase matching is used. In this example, a focus size in the direction parallel to the walk-off is large enough at all of the desired out-of-focus locations of the nonlinear crystal 101 so that the impact of the walk-off on the beam quality can be minimized. For tightly focused beams, which have a large divergence, the walk-off can create side lobes of the beam in the walk-off direction that cause deviations from an ideal Gaussian beam shape, and, thus, have a negative impact on the spatial beam quality in the walk-off direction. This can be detrimental for applications (e.g., in wafer inspecting) that rely on an ideal Gaussian beam shape. The far-field beam shape of the generated harmonic beam for a given crystal length, beam size, and walk-off angle can be simulated. Based on the simulation, the deviation of the far field profile from an ideal Gaussian profile can then be determined for any lateral position across the beam profile. Based on this calculation a waist size can be chosen, so that the maximum deviation of the lateral far field profile from a Gaussian profile is smaller than a specified value. This specified value may be, for example, 4%.

In another example, the laser beam 103 is diffraction limited or near diffraction-limited and a nonlinear crystal 101 with critical phase matching is used. The nonlinear crystal 101 location is adjustable. A Rayleigh range in the direction parallel to the walk-off is large enough so that the laser beam 103 divergence in the direction parallel to the walk-off remains small enough for all of the desired out-of-focus locations of the nonlinear crystal 101 so that the impact of the crystal angular acceptance on the spatial beam quality can be minimized.

Figure 5:
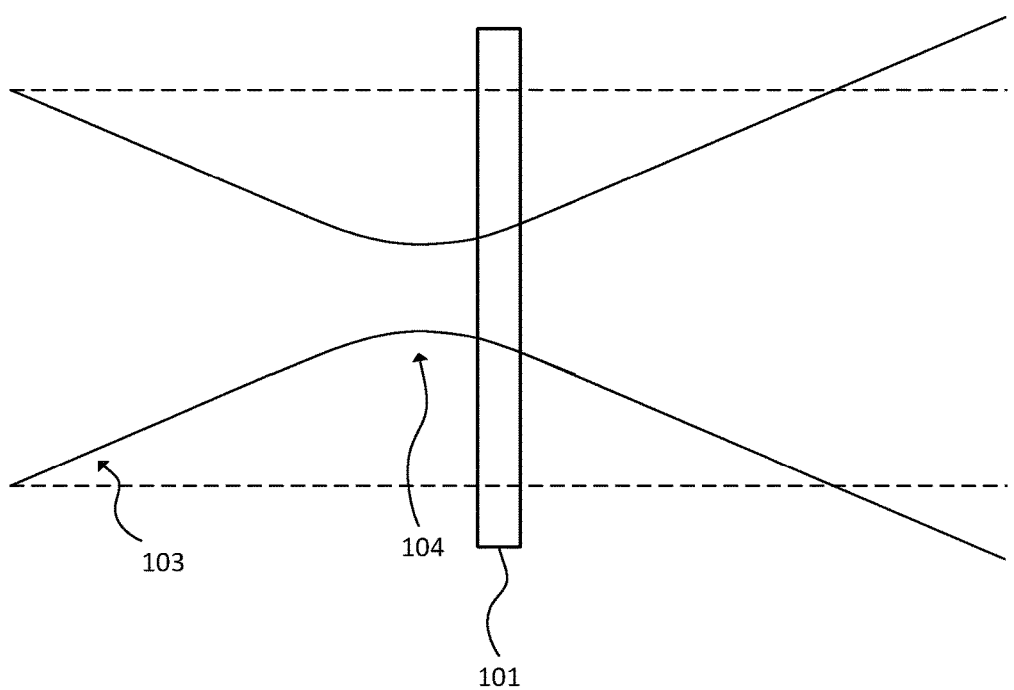
FIG. 5 is an exemplary focus size.

FIG. 5 is an exemplary focus 104 size. The size of the focus 104 of the laser beam 103 in the plane parallel to the walk-off (dashed lines) is larger than that in the plane perpendicular to the walk-off (solid lines). The foci in both planes are located outside of the nonlinear crystal 101. The focus in the walk-off direction is larger than the focus in the non-walk-off direction. The beam propagation in the walk-off direction is described by the lines with the smaller curvature, whereas the propagation in the non-walk-off direction shows a smaller and more pronounced beam waist.

In an example, the nonlinear crystal is positioned such that the focus of the laser beam is outside the nonlinear crystal in the at least one plane perpendicular to the beam propagation direction of the laser beam with a Rayleigh range configured such that time averaged fundamental optical power density or harmonic optical power density at the spatial peak of the beam profile on or in at least one optical component in the system is limited to below 1 MW/cm$^2$. The crystal mount assembly can be adjustable or can include a plurality of mounting features at different distances from the laser source in this example.

In another example, the laser beam is a pulsed laser beam. The nonlinear crystal is positioned such that the focus of the pulsed laser beam is outside the nonlinear crystal in the at least one plane perpendicular to the beam propagation direction of the pulsed laser beam with a Rayleigh range configured such that the fundamental optical fluence or harmonic optical fluence on or in at least one optical component of the system is limited to below 10 J/cm². Other values of fundamental optical fluence or harmonic optical fluence are possible. For example, the fundamental optical fluence or harmonic optical fluence on or in at least one optical component may be from 1 J/cm² to 20 J/cm², including all values to the 0.5 J/cm² and ranges therebetween. The crystal mount assembly can be adjustable or can include a plurality of mounting features at different distances from the laser source in this example.

Figure 6:
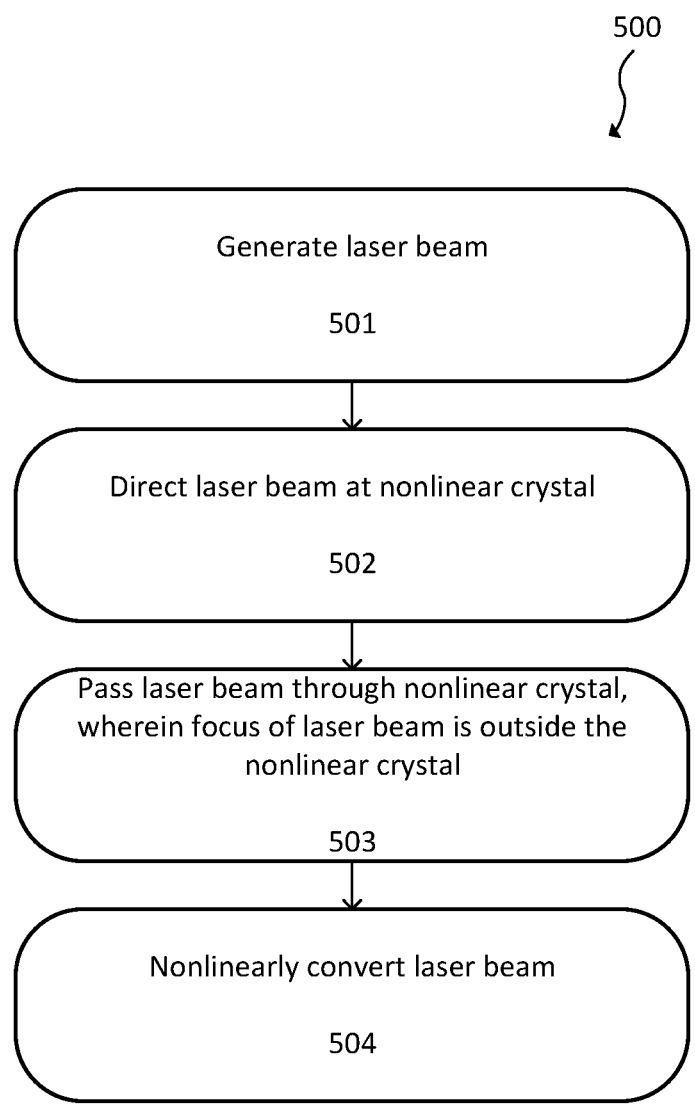
FIG. 6 is a flowchart in accordance with an embodiment of the present disclosure.

FIG. 6 is a flowchart of a method 500. The method 500 includes generating a laser beam 501. The laser beam is directed at a nonlinear crystal 502. This may be through, for example, beam shaping optics. The laser beam passes through the nonlinear crystal 503. A focus of the laser beam is outside the nonlinear crystal in at least one plane perpendicular to a beam propagation direction of the laser beam. The laser beam is nonlinearly converted 504. The nonlinear conversion of the laser beam can be SHG, SFG, or difference frequency generation (DFG). The crystal mount assembly can be adjustable or can includes a plurality of mounting features at different distances from the beam source.

The focus 104 also can be located downstream of the nonlinear crystal 101 and provide many of the advantages disclosed herein. The beam size on the crystal output facet is smaller with a downstream focus than in the case of an upstream focus. Thus, the power density on the output facet is higher and the crystal lifetime may be shorter. This effect is generally minimal, so either an upstream focus or a downstream focus may be used with the embodiments disclosed herein.

The nonlinear wavelength conversion process and the embodiments described herein can be SHG, SFG, or difference frequency generation. Thus, the wavelength conversion process can include one or more input laser beams.

The embodiments disclosed herein provide multiple advantages or benefits. First, the beam size can be independently optimized. Thus, the optical power density in the nonlinear crystal and on components of the beam shaping optics can be optimized. A small focus (in at least one plane) increases the divergence and convergence of the harmonic laser beam inside a wavelength converter, such as the wavelength converter 100. Therefore the power density on the beam shaping optics can be decreased without increasing the dimensions of the wavelength converter. This increases the optics lifetime. A laser beam, described by Gaussian beam propagation, has a constant product of waist diameter d0 and far-filed divergence angle $\theta_{FF}$, so that $d0*\theta_{FF}=M^2*\lambda/(2*\pi)$, with $M^2 \geq 1$ being the beam propagation parameter and $\lambda$ being the wavelength of the radiation. For a given laser beam, the product of d0 and $\theta_{FF}$ parallel to each axis and perpendicular to be beam propagation direction is a constant, so the far field divergence angle increases as the waist diameter decreases. Therefore, the divergence of the fundamental beam increases when the waist size is decreased.

As the divergence of the fundamental beam increases, the divergence of the harmonic beam increases as well. For the example of SHG, the divergence of fundamental and harmonic beam are identical in the non-walk-off direction. In the walk-off direction divergence of fundamental and harmonic beams are not identical due to the presence of walk-off. However, an increased divergence of the fundamental beam still results in an increased divergence of the harmonic beam.

Second, by positioning the nonlinear crystal outside the focus, the power density inside the nonlinear crystal decreases. This increases the nonlinear crystal lifetime and improves the spatial beam quality of the harmonic radiation. Both the power density inside the nonlinear crystal and on the beam shaping optics can be optimized independently of one another without increasing the form factor of the wavelength converter.

Third, the power density in the nonlinear crystal can be adjusted without optics redesign by moving the nonlinear crystal along the beam propagation direction. This simplifies two power scaling options. In an instance, the harmonic power can be increased by increasing the fundamental power while maintaining the same power density. For example, fundamental power can be increased by using a more powerful laser. This is achieved by moving the nonlinear crystal away from the focus, and, thus, increasing the beam size inside the nonlinear crystal. In another instance, the harmonic power can be increased by increasing the power density inside the crystal and, thus, the conversion efficiency when a nonlinear crystal with a higher damage threshold becomes available. This is achieved by moving the nonlinear crystal toward the focus and, thus, reducing the beam size inside the nonlinear crystal.

Fourth, this can be used to retrofit existing tools because minimal changes to the beam shaping optics are necessary. The wavelength converter, such as the wavelength converter 100, being part of a system, can be modified or reconfigured as part of a field-upgrade without any changes or with minimal changes to the optics design.

Fifth, the position of the nonlinear crystal can be moved depending on the material in the nonlinear crystal or the power density of the laser beam. The position of the nonlinear crystal can be adjusted or optimized if, for example, the type of or properties of laser beam is changed.

Sixth, the embodiments disclosed herein may provide improved performance or lifetime with pulsed laser beams. A pulsed laser can cause significant damage to a nonlinear crystal at high power densities. Changing the power density in the nonlinear crystal can enable use of pulsed laser beams with less damage to the nonlinear crystal.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:
1. A method comprising:
  generating a laser beam;
  directing the laser beam at a nonlinear crystal configured for wavelength conversion, wherein the nonlinear crystal is positioned such that a focus of the laser beam is outside the nonlinear crystal in at least one plane perpendicular to a beam propagation direction of the laser beam, wherein the nonlinear crystal is disposed on a crystal mount assembly, wherein the crystal mount assembly provides an angle stability of greater than 0% and less than or equal to 27% of an angular acceptance range during operation, wherein the crystal mount assembly includes a plurality of mounting features at different distances from a laser source in the beam propagation direction, wherein each of the mounting features includes a hole that the crystal mount assembly is fastened into, and wherein a beam size of the laser beam in the nonlinear crystal is provided by selecting one of the mounting features; and nonlinearly converting the laser beam from a first wavelength to a second wavelength with the nonlinear crystal.

2. The method of claim 1, wherein the nonlinearly converting is one of second harmonic generation, sum-frequency generation, or difference frequency generation.

3. The method of claim 1, further comprising directing the laser beam through beam shaping optics disposed between a laser source and the nonlinear crystal and disposed downstream of the nonlinear crystal in the beam propagation direction.

4. The method of claim 1, further comprising adjusting a beam size of the laser beam in the nonlinear crystal with the crystal mount assembly by adjusting a distance between a center of the nonlinear crystal and the focus.

5. The method of claim 1, wherein the nonlinear crystal is positioned such that the focus of the laser beam is outside the nonlinear crystal in the at least one plane perpendicular to the beam propagation direction of the laser beam with a Rayleigh range configured such that time averaged fundamental optical power density or harmonic optical power density at the spatial peak of the beam profile on or in at least one optical component in the system is limited to below 1 $MW/cm^2$.

6. The method of claim 1, wherein the laser beam is a pulsed laser beam, and wherein the nonlinear crystal is positioned such that the focus of the pulsed laser beam is outside the nonlinear crystal in the at least one plane perpendicular to the beam propagation direction of the pulsed laser beam with a Rayleigh range configured such that fundamental optical fluence power density or harmonic optical fluence on or in at least one optical component of the system is limited to below 10 $J/cm^2$.

7. The method of claim 1, wherein the crystal mount assembly is adjustable, and wherein the nonlinear crystal is positioned such that the focus of the laser beam is outside the nonlinear crystal in the at least one plane perpendicular to the beam propagation direction of the laser beam with a Rayleigh range configured such that time-averaged fundamental optical power density or harmonic optical power density at the spatial peak of the beam profile on or in at least one optical component in the system is limited to below 1 $MW/cm^2$.

8. The method of claim 1, wherein the laser beam is a pulsed laser beam, wherein the crystal mount assembly is adjustable, and wherein the nonlinear crystal is positioned such that the focus of a pulsed laser beam is outside the nonlinear crystal in the at least one plane perpendicular to the beam propagation direction of the pulsed laser beam with a Rayleigh range configured such that fundamental optical fluence or harmonic optical fluence on or in at least one optical component in the system is limited to below 10 $J/cm^2$.

9. The method of claim 1, wherein the focus is at least one of circular, elliptical, or astigmatic.

10. The method of claim 1, wherein the focus is elliptical, and wherein the focus in a plane parallel to a walk-off is larger than the focus in a plane perpendicular to the walk-off.

11. The method of claim 1, wherein the focus is astigmatic, and wherein the focus in one plane is inside the nonlinear crystal and the focus in another plane is outside the nonlinear crystal.

12. The method of claim 1, wherein the focus is astigmatic and elliptical, wherein the focus in one plane is inside the nonlinear crystal and the focus in another plane is outside the nonlinear crystal, and wherein the focus inside the nonlinear crystal has a larger width than the focus outside the nonlinear crystal.

13. The method of claim 1, further comprising fastening the crystal mount assembly into one of the mounting features.

14. The method of claim 13, wherein the fastening comprises screwing the crystal mount assembly into one of the mounting features.

* * * * *